Jan. 8, 1957   M. L. BENJAMIN ET AL   2,776,839
EXPANDING MANDREL AND METHOD OF MAKING SAME
Filed Oct. 20, 1955   2 Sheets-Sheet 2

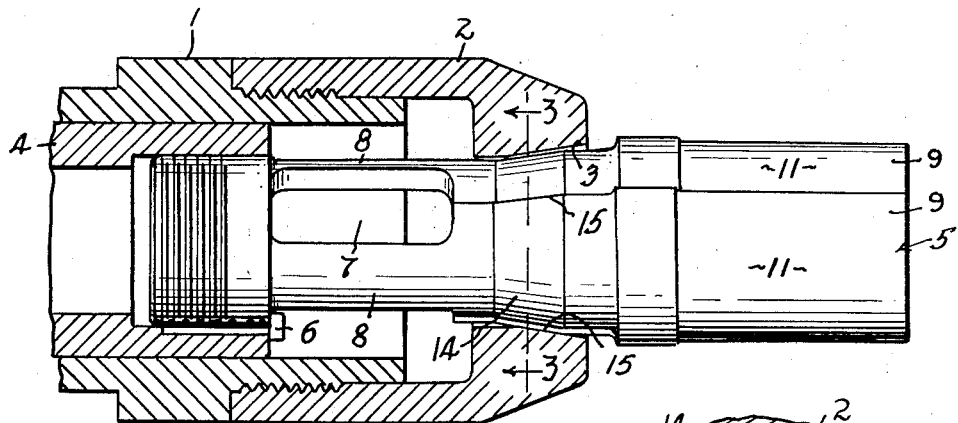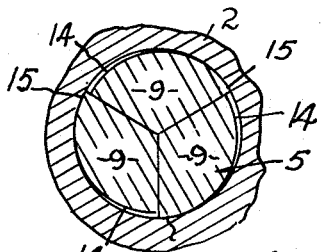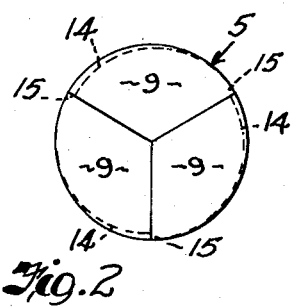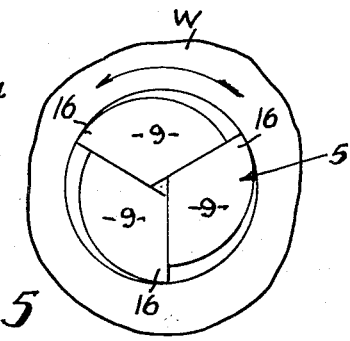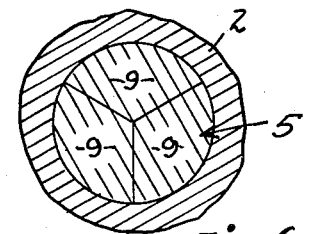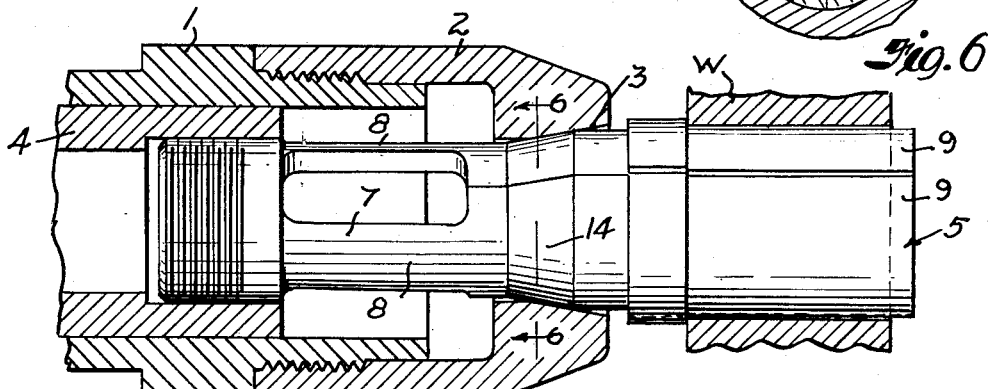

INVENTORS
MILTON L. BENJAMIN AND
FRANKLYN E. WINNEN.
BY Oberlin & Limbach
ATTORNEYS.

United States Patent Office 2,776,839
Patented Jan. 8, 1957

2,776,839

EXPANDING MANDREL AND METHOD OF MAKING SAME

Milton L. Benjamin and Franklyn E. Winnen, Cleveland, Ohio, assignors to Erickson Tool Company, Cleveland, Ohio, a corporation of Ohio Application October 20, 1955, Serial No. 541,668

5 Claims. (Cl. 279—2)

The present invention relates generally as indicated to an expanding mandrel and to the method of making the same, such expanding mandrel being adapted, for example, to be employed for internally gripping a hollow or bored workpiece for the performance of external machining, grinding, or other operations thereon.

At the present time, a majority of the expanding mandrel constructions in use comprise an axially slotted sleeve provided with internal cam surfaces through which said sleeve is expanded (as by a camming arbor therewithin) into gripping engagement within a workpiece. It is also known in the prior art to provide helically slotted mandrels in which inward pressure at one zone of the helical jaws causes outward displacement thereof at a zone axially removed one-half turn, an advantage of such expanding mandrel being that the socket or body of a conventional contractible collet chuck may be employed to exert inward pressure at such one zone of the helical jaws.

It is a principal object of this invention to provide an expanding mandrel which is formed with straight, axial slots and in which radial meeting faces of adjoining segmental jaws coact to produce an outward movement thereof for gripping a surrounding workpiece while adjacent portions of the jaws are pressed inward as by means of a conventional collet chuck body.

It is another object of this invention to provide a novel method of making an expanding mandrel of the character referred to above.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view of one form of the present expanding mandrel, the same being shown in contracted condition for facilitating the positioning of a workpiece thereon or for the removing of a finished workpiece, the means for actuating the mandrel being shown in cross-section;

Fig. 2 is an end elevation view of the expanding mandrel of Fig. 1 as viewed from the righthand side of Fig. 1;

Fig. 3 is a transverse cross-section view taken substantially along the line 3—3, Fig. 1;

Fig. 4 is similar to Fig. 1 except showing the mandrel in expanded condition internally gripping a workpiece;

Fig. 5 is an end elevation view of the expanded mandrel of Fig. 4, such view being from the righthand side of Fig. 4;

Fig. 6 is a transverse cross-section view taken substantially along the line 6—6, Fig. 4;

Figure 11:
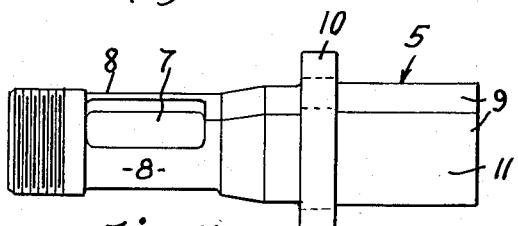
Figs. 11 and 12 are side and end elevation views showing the deformation of the Fig. 9 mandrel to close the slots, the workpiece-gripping surfaces of the jaws having been machined to cylindrical form while the slots are thus closed.
Figure 13:
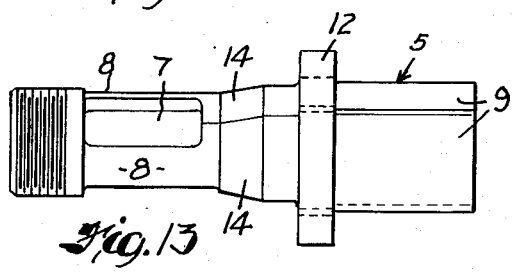
Figure 14:
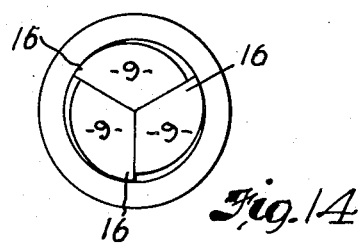
Figure 15:
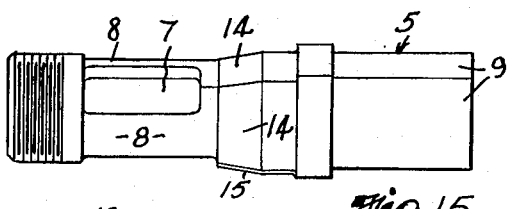
Figure 16:
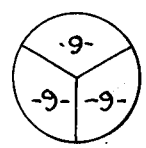
Figure 17:
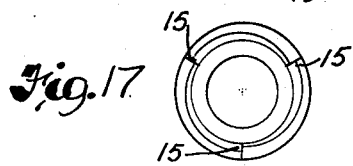

Figs. 13 and 14 are side and end elevation views of the Fig. 11 mandrel showing the workpiece-gripping portions of the jaws mutually displaced to the workpiece-engaging condition and showing the jaw-camming surfaces machined to conical form while the jaw portions are thus displaced; and Figs. 15, 16, and 17 are side, right end and left end elevation views showing the finished mandrel of Fig. 13, when deforming force is released, to provide cam surfaces which are effective to mutually outwardly slide the meeting radial faces of the segmented jaws when inward pressure is applied on said cam surfaces.

Referring now more particularly to the drawings, and first to Figs. 1-6, the spindle 1 of a machine tool is designated by the reference numeral 1, said spindle having threaded or otherwise secured thereto the spindle nose 2 which is formed with an outwardly flared frusto-conical cam surface 3. Axially reciprocably mounted in the spindle is the draw bar or draw sleeve 4 provided with a threaded end into which the rear threaded end of the present expanding mandrel 5 is screwed, and preferably the draw sleeve 4 and mandrel 5 are formed with complementary grooves for the key 6.

As will be seen later, by thus assembling the mandrel 5 and sleeve 4 against relative rotation, the mandrel 5 when machined to its final form while held by sleeve 4 will always be truly coaxial with respect to the spindle 1 and draw sleeve 4, since any thread errors are compensated for by the keying together of the mandrel 5 and draw sleeve 4. In other words, each time that this mandrel 5 is used, the sleeve 4 and mandrel 5 will be in the same relative rotary positions with respect to each other so that the thread errors will not throw the mandrel 5 out of alignment with the spindle 1 and draw sleeve 4.

Referring now in detail to the expanding mandrel 5, the same is here shown as comprising a generally cylindrical body which is threaded at its rear end as already described and which, adjacent the threaded end, is formed with a plurality of slots 7 which are relatively wide and which leave elongated, resilient jaw portions 8 therebetween. The remaining front portion of the length of the mandrel 5 is preferably solid (or substantially solid) and is axially slotted, as shown, through the front end and through slots 7 to provide a plurality of circumferentially adjacent, segmental jaws 9, each of which includes the resilient neck portion 8 integrally connected to the rear tubular and threaded portion of the mandrel.

In order to more fully understand the nature of this invention and its manner of operation, reference should now be had to Figs. 9–17, which show the successive steps in the manufacture of the mandrel 5.

Figure 9:
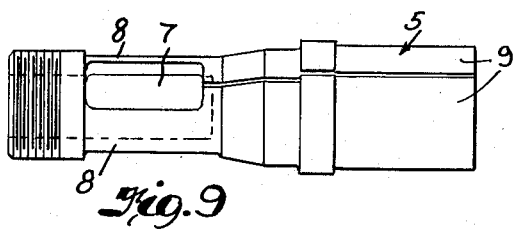
Figs. 9 and 10 are side and end elevation views, respectively, showing a partly finished mandrel as initially slotted.
Figure 10:
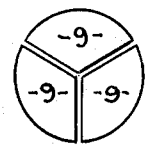

The mandrel 5 thus far described is shown in Figs. 9 and 10. In other words, a length of bar stock is bored from one end towards the middle (as shown in dotted lines), is turned to approximately the contour shown, is formed with threads at the rear end, is formed with wide slots 7 to provide resilient jaw portions 8, and is axially slotted to form segmental jaws 9 integral with the respective resilient portions 8.

Figure 12:
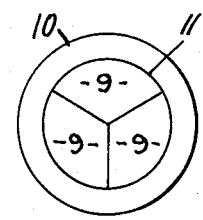

The next step in the method is to deform the partly finished mandrel 5 (preferably a permanent deformation) as by means of a ring 10 or the like fitted over a portion of the jaws 9, said ring 10 being effective to deform the jaws 9 so as to close the slots therebetween as clearly shown in Fig. 12.

With the jaws 9 thus radially inwardly deformed to close the slots therebetween, the exterior surface 11 of the front end portion of the jaws 9 may be machined to cylindrical form for ease of slipping of a workpiece thereon and therefrom. As aforesaid, this deformation of the jaws 9 is preferably a permanent deformation so that, even after the ring 10 is removed, the meeting radial faces of the jaws 9 will remain in engagement or at least in close proximity.

After the jaws 9 have been deformed to close the slots therebetween, the jaws 9 are then mutually slid with respect to each other along the meeting radial faces thereof as shown in Fig. 14, and such deformation may be effected as by means of another ring 12 forced onto the mandrel 5 adjacent the workpiece-gripping portions 11 thereof. While the mandrel 5 is thus deformed, the cam surfaces 14 may be machined to conical or like form, as shown in Fig. 13, coaxial with the mandrel 5.

Now, when the deforming pressure is released by removing the ring 12, the jaws 9 will spring back to the Fig. 16 condition (same as Fig. 12), and such springing back of the jaws 9 causes the cam surfaces 14 to assume the stepped form as clearly shown in Fig. 17.

It can be seen from Figs. 15, 16, and 17 that, when inward pressure is applied at the projecting corners 15 of the cam surfaces 14, the workpiece-gripping portions 11 of the jaws will be slid along their meeting radial faces, as in Fig. 14, so as to expand outwardly into gripping engagement with a workpiece.

Going back now to Figs. 1-6, Figs. 1, 2, and 3 show the mandrel 5 in its normally idle position with the high spots 15 of the cam surface 14 engaging the frustoconical flare mouth 3 in the spindle nose 2 and the workpiece-engaging portions 11 of the jaws 9 are bounded by a cylinder of such size that a workpiece W may be slipped thereonto and therefrom.

Referring to Figs. 4-6, the mandrel 5 herein has been drawn axially toward the left of the draw sleeve 4 threadedly engaged therewith, whereupon the portions of the jaws adjacent the high spots 15 are forced inwardly with the result that the jaws 9 are flexed about the neck portions 8 thereof, and the meeting radial faces of the jaws 9 are caused to slide with respect to each other, as shown in Fig. 5, with the high spots 16 of the jaws 9 engaged internally of the surrounding workpiece W.

The spindle 1 preferably rotates in the direction shown by the arrow in Fig. 5, it having been found that this is preferred and results in a firmer grip when the leading edges of the jaws 9 contact the interior of the workpiece W.

Figure 7:
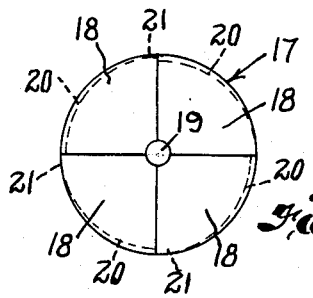
Fig. 7 is an end elevation view like Fig. 2 but illustrating a modified form of expanding mandrel.
Figure 8:
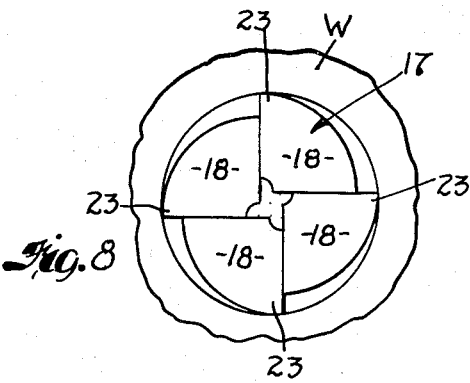
Fig. 8 is an end elevation view like Fig. 5 except showing the Fig. 7 mandrel in expanded, workpiece-gripping condition.

The form of the invention thus far described is provided with three jaws 9 separated by three radial and axially extending slots, but, as apparent from Figs. 7 and 8, any number of jaws may be provided. In Figs. 7 and 8, the mandrel 17 is formed with four jaws 18, the slots being perpendicular to each other and there being a small drilled hole 19 in the center to accommodate the relative sliding of the jaws 18 as exaggerated in Fig. 8.

The cam surface 20 is shown in dotted lines in Fig. 7, and when inward pressure is applied at the high spots 21 of the cam, the jaws 18 are relatively slid along their meeting radial faces to result in flexing of the jaws to provide high spots 23 which engage the interior of the workpiece W. In this case, the inward pressure on the high spot 21 of one cam surface 20 results in deformation of the adjacent jaw 18 into gripping engagement with the workpiece W.

It is to be understood that, in the drawings herein, the high spots 15 and 21 of the cam surfaces 14 and 20 and the high spots 16 and 23 of the workpiece-gripping surfaces have been somewhat exaggerated in proportion; and that, in actual cases, these high spots need only project a matter of .015" or less. Thus, for example, with the workpiece W formed with a hole of 1.000" plus or minus .003", the workpiece-gripping end of the mandrel 5 or 17 could well bemachined to .995" so that all of the workpieces can readily be slipped on or off.

For secure gripping of all of the workpieces having holes ranging from .997 to 1.003", the radial movement of the jaws need only be about .005" with a corresponding or less projection of the high points of the cam surfaces in order to securely grip these workpieces.

It is believed that this invention can readily be understood without mathematical analysis. Of course, in the Figs. 7 and 8 construction, the inward pressure on one jaw 18 acts directly on the adjacent jaw 18, whereas in the other form of the invention with three slots, the inward pressure on one jaw 9 acts against a relatively oblique surface of the adjacent jaw 9 whereby the force is resolved into a tangential, radially outward force and a normal force, and the combination of these force vectors results in the mutual relative sliding of the jaws 9 with respect to each other to end up with high points 16 which engage within the workpiece W.

Other modes of applying the principle of the invention may be employed, change being made as regards the details described, provided the features stated in any of the following claims, or the equivalent of such, be employed.

We therefore particularly point out and distinctly claim as our invention:

1. An expanding mandrel for internally gripping a workpiece comprising an axially slotted body providing a plurality of jaws which have juxtaposed radial faces, said jaws being resiliently connected at one end to said body, and cam means whereat inward pressure is adapted to be applied on the respective jaws adjacent such one end thereof along lines generally parallel to the respective juxtaposed faces to mutually slidably flex said jaws relative to said body and to each other to thereby move the other ends of said jaws outwardly to grip a surrounding workpiece, said cam means comprising conical surfaces on the respective jaws having axes offset radially from the axis of said mandrel to provide high points for application of inward pressure.

2. In combination, a chuck body providing a socket having a cam surface, an expanding mandrel having one end inserted in such socket for application of inward force thereon by said cam surface responsive to relative axial movement of said body and mandrel, and means for thus relatively moving said body and mandrel, said mandrel being axially slotted from its one inserted end through its other end to provide a plurality of segmental jaws whose meeting radial faces are mutually slid as a result of such inward force on said jaws whereby the other end of said mandrel is expanded to grip a surrounding workpiece, said cam surface being in contact with said mandrel only adjacent one edge portion of each jaw and out of contact with the remaining circumferential portion from such one edge portion to the other of each jaw.

3. In combination, a chuck body providing a socket having a cam surface, an expanding mandrel having one end inserted in such socket for application of inward force thereon by said cam surface responsive to relative axial movement of said body and mandrel, and means for thus relatively moving said body and mandrel, said mandrel being axially slotted from its one inserted end through its other end to provide a plurality of segmental jaws whose meeting radial faces are mutually slid as a result of such inward force on said jaws whereby the other end of said mandrel is expanded to grip a surrounding workpiece, said cam surface being in contact with said mandrel only adjacent one edge portion of each jaw and out of contact with the remaining circumferential portion from such one edge portion to the other of each jaw, said means and mandrel being threaded together, and a key locking said means and mandrel against relative rotation whereby said mandrel is predeterminedly positioned in said body irrespective of eccentricity and misalignment of the means and mandrel threads.

4. In combination, a chuck body providing a socket having a cam surface, an expanding mandrel having one end inserted in such socket for application of inward force thereon by said cam surface responsive to relative axial movement of said body and mandrel, and means for thus relatively moving said body and mandrel, said mandrel being axially slotted from its one inserted end through its other end to provide a plurality of segmental jaws whose meeting radial faces are mutually slid as a result of such inward force on said jaws whereby the other end of said mandrel is expanded to grip a surrounding workpiece, said cam surface being outwardly flared, and each of said jaws being provided with a cooperating cam surface engageable with said body cam surface only at a region adjacent one edge portion of each jaw and effective upon inward axial movement of said mandrel to move said jaws inwardly to effect such mutual sliding of said jaws as aforesaid at a region axially outward from the engaged cam surfaces of said body and mandrel.

5. An expanding mandrel for internally gripping a workpiece comprising a body formed with relatively movable jaws which include adjacent workpiece-gripping and camming zones and which are mutually outwardly slidable to grip a workpiece surrounding said gripping zone, said camming zone being constituted by each jaw having an edge portion which is normally radially outwardly offset with respect to the circumferentially adjacent edge portion of the other jaw, at which time said jaws in the workpiece gripping zone have circumferentially adjacent portions forming a substantially complete circle, whereby inward pressure applied at said outwardly offset edge portions of jaws in said camming zone effects such relative outward sliding thereof, so that the circumferentially adjacent portions of the jaws in the camming zone form a substantially complete circle and the circumferentially adjacent portions in said workpiece gripping zone are radially offset to grip a workpiece.

References Cited in the file of this patent

UNITED STATES PATENTS

| | | |
|---|---|---|
| 836,613 | Spear | Nov. 20, 1906 |
| 1,086,393 | Moseley | Feb. 10, 1914 |
| 1,683,167 | Cunningham | Sept. 4, 1928 |
| 1,907,897 | Swegles | May 9, 1933 |
| 2,105,618 | Silva | Jan. 18, 1938 |
| 2,507,686 | Altmayer | May 16, 1950 |

FOREIGN PATENTS

| | | |
|---|---|---|
| 537,369 | France | Mar. 2, 1922 |